United States Patent [19]

Lewis et al.

[11] 4,086,592
[45] Apr. 25, 1978

[54] DIGITAL SIDELOBE CANCELLER

[75] Inventors: Bernard L. Lewis, Oxon Hill; Frank F. Kretschmer, Jr., Laurel, both of Md.

[73] Assignee: The United States of America as represented by the Secretary of the Navy, Washington, D.C.

[21] Appl. No.: 818,180

[22] Filed: Jul. 22, 1977

[51] Int. Cl.² ............................. G01S 9/42; H04B 1/12
[52] U.S. Cl. ............................. 343/100 LE; 343/7.7; 343/100 CL; 325/371
[58] Field of Search ............... 343/100 CL, 100 LE, 343/7.7, 18 E; 325/371; 340/15.5 CC, 15.5 TA

[56] References Cited

U.S. PATENT DOCUMENTS

| | | | |
|---|---|---|---|
| 3,177,489 | 4/1965 | Saltzberg | 343/100 LE |
| 3,202,990 | 8/1965 | Howells | 343/100 CL |
| 3,290,684 | 12/1966 | Renn et al. | 343/100 LE |
| 3,355,736 | 11/1967 | Perper | 343/100 CL |
| 3,881,177 | 4/1975 | Len et al. | 325/371 |
| 3,916,408 | 10/1975 | Evans et al. | 343/100 LE |
| 3,938,153 | 2/1976 | Lewis et al. | 343/100 LE |
| 3,938,154 | 2/1976 | Lewis | 343/100 CL |
| 3,978,483 | 8/1976 | Lewis et al. | 325/371 |
| 3,982,245 | 9/1976 | Soule, Jr. et al. | 343/100 CL |
| 4,044,359 | 8/1977 | Applebaum et al. | 343/100 LE |

*Primary Examiner*—Maynard R. Wilbur
*Assistant Examiner*—Lawrence Goodwin
*Attorney, Agent, or Firm*—R. S. Sciascia; Philip Schneider; David G. Rasmussen

[57] ABSTRACT

A digital open-loop canceller is used to decorrelate one signal from another in such applications as coherent sidelobe cancellers and moving target indicators. The invention measures the correlation between a complex main input signal and a complex auxiliary input signal in digital form. It divides the correlation coefficient by the average value of the auxiliary signal magnitude squared, multiplies the ratio by the auxiliary signal and subtracts the result from the main input signal to cancel correlated components.

6 Claims, 5 Drawing Figures

DIGITAL SIDELOBE CANCELLER

BACKGROUND OF THE INVENTION

The invention relates generally to cancellers for use in sidelobe canceller systems, MTI systems and other systems that decorrelate signals by removing correlated components. Specifically, the invention relates to digital open-loop cancellers.

DESCRIPTION OF THE PRIOR ART

Generally a signal-processing system is designed to reduce the presence of undesired signals received by its receiver. An example of apparatus to reduce undesired signals is a canceller. A canceller may be used for cancelling radar clutter that is correlated from pulse to pulse in an MTI system, for cancelling interference entering a radar's sidelobes in a sidelobe canceller system, and for similiar applications. Up to the present time, the basic canceller has been an analog adaptive closed-loop canceller as described in the U.S. Pat. No. 3,202,990 to Paul W. Howells. This canceller has several disadvantages: the loop gain and effective bandwidth are proportional to auxiliary signal level; the loop gain must be limited to avoid oscillation or instability; and imperfect multipliers permit interference feedthrough from the auxiliary to radar channels.

The Howell's canceller loop has been implemented in digital form but the digital loop still has the disadvantage that it is a closed loop dependent on auxiliary signal power and loop gain. Such a digital loop is disclosed in U.S. Pat. No. 3,938,153.

SUMMARY OF THE INVENTION

The present invention is a digital open-loop canceller which is independent of loop gain and auxiliary signal power. It uses digital circuits which do not have drift problems as do analog circuits. The digital open-loop canceller receives a digital, complex main input $V_m$ and a digital, complex auxiliary input $V_a$ which may have correlated signal components. It is desired in the canceller to cancel any correlated signal components from the digital, complex main input $V_a$ to obtain a residue signal $V_r$. A conjugator receives the digital, complex auxiliary signal $V_a$ and conjugates it to obtain a signal $V_a^*$. A first multiplier receives $V_a^*$ and $V_m$ and multiplies them to obtain a signal $V_a^* V_m$. Similarly, a second multipler receives the conjugated signal $V_a^*$ and $V_a$ and multiplies them to obtain a signal $V_a V_a^*$. A first sample summer will sum N sample outputs of the first multiplier (i.e., $V_m V_a^*$) where N is an integer greater than 1. Similarly, a second sample summer will sum N sample outputs of the second multiplier (i.e., $V_a V_a^*$) where N is an integer greater than 1. The outputs of the first and second summers are then fed to a divider which divides the outputs to obtain an output $\overline{V_m V_a^*} / \overline{V_a V_a^*}$, where the bars denote averaging over N samples.

This quotient is a measure of the correlation between $V_m$ and $V_a$ and is used with the signal $V_a$ in the third multiplier to obtain a weighted, digital complex auxiliary signal $$\left( \frac{\overline{V_m V_a^*}}{\overline{V_a V_a^*}} \right) V_a$$

This weighted signal is then substrated from the digital, complex main input $V_m$ to obtain the desired output residue signal $V_r$. The correlated components of $V_m$ and $V_a$ have been cancelled and $V_r$ is the remaining portion of $V_m$. The digital sidelobe canceller can be used in sidelobe canceller systems, MTI systems, and most applications in which adaptive closed loop cancellers can be used.

The novel aspect of the digital sidelobe canceller is the conversion of the complex main and auxiliary inputs to digital signals and the use of a circuit which includes a conjugator, first and second multipliers, first and second sample summers, a divider, and a third multiplier to derive the optimum weight from the input signals $V_m$ and $V_a$ rather than from the residue $V_r$ as in the prior art. This method of weight determination provides optimum cancellation independent of auxiliary signal power and eliminates tendencies toward instability

BRIEF DESCRIPTION OF THE PREFERRED EMBODIMENT

Figure 1:
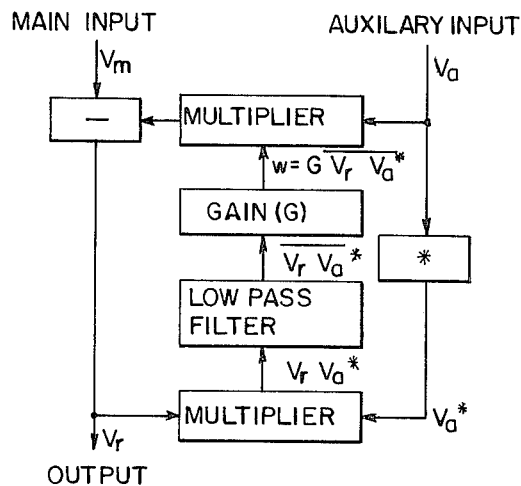
FIG. 1 is a block diagram of a prior art analog adaptive closed-loop canceller.

The basic adaptive loop canceller used by industry in applications such as sidelobe cancellers is shown in FIG. 1. This loop is described in U.S. Pat. No. 3,202,990 to Howells. In FIG. 1, the system is based on the general equation common to all coherent canceller systems $$V_r = V_m - W V_a \tag{1}$$

where
- $V_m$ is a complex main input signal from a main radar antenna (a vector)
- $V_r$ is a complex output signal (a vector)
- $V_a$ is a complex auxiliary interference signal obtained from an auxiliary antenna (a vector).
- W is a complex weight (vector) derived by the processing loop to minimize $V_r$.

In conventional canceller loop circuits (e.g., FIG. 1), W is derived in the negative-feedback loop according to the relation $$W = G \overline{V_r V_a^*} \tag{2}$$

where the bar denotes averaging in the filter shown in FIG. 1,
- G is the gain built into the loop, and
- $V_a^*$ is the conjugate of $V_a$ Multiplying eq(1) by $V_a^*$ and averaging yields $$\overline{V_r V_a^*} = \overline{V_m V_a^*} - W \overline{V_a V_a} \tag{3}$$

From (2) and (3) one obtains $$W = G \overline{V_m V_a^*} / (1 + G \overline{V_a V_a^*}) \tag{4}$$

Note that W in (4) approaches the optimum weight $W_{opt}$ when $G V_a^2$ approaches infinity and that W is less than $W_{opt}$ when $G V_a^2$ is less than infinity.

Substituting (4) into (1) and averaging yields $$\overline{V_r} = \overline{V_m} - \frac{\overline{GV_m|V_a|^2}}{1+G|V_a|^2} \qquad (5)$$

Assuming complete correlation between $V_m$ and $V_a$, and getting a common denominator in (5) yields $$\overline{V_r} = \frac{\overline{V_m}}{1+G\overline{|V_a|^2}} \qquad (6)$$

Note that $V_r$ does not approach zero unless $G|V_a^2|$ approaches infinity. Note also that G must be limited to insure loop stability since closed-loops oscillate when their gains get too big. Thus, prior art closed-loop systems cannot provide complete (optimum) cancellation.

Figure 2:
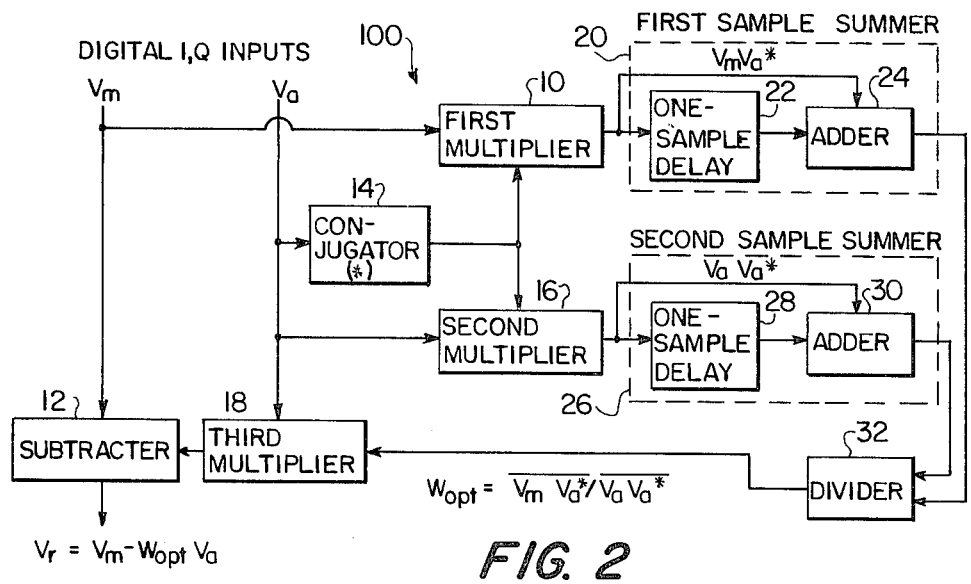
FIG. 2 is a block diagram of a digital open-loop canceller.

A digital canceller 100 which does not have the drawbacks of the adaptive closed-loop canceller is shown in FIG. 2.

A main input signal $V_m$, for example, a radar return received by the main antenna of a radar, is an input to the canceller. $V_m$ is a complex signal which contains vector components of both desired and undesired information. The desired components could be the echos from a target whereas the undesired components could be interference signals, jamming signals, or clutter. Since $V_m$ is a complex signal, in digital form it must be separated into its real (I) and imaginary (Q) components. The Q, or quadrature component, is 90° out-of-phase with the I component. Separation of complex signals into I and Q components for I and Q channels is known in the art and described in *Radar Design Principles,* F. E. Nathanson, McGraw-Hill, 1969, page 560.

The canceller similiarly has an auxiliary input $V_a$, for example, a signal from an omnidirectional auxiliary antenna, or a delayed MTI signal. $V_a$ has a component which may be correlated to an undesirable component of $V_m$ and will be used in cancelling this undesirable component. $V_a$ is a digital signal having I and Q components.

Before describing the apparatus of FIG. 2, the theory of operation will be examined. The digital open-loop canceller departs from prior art adaptive closed-loop cancellers by deriving W in a different way such that it is not dependent on gain or auxiliary signal power level. In the digital open-loop canceller, the basic equation $$V_r = V_m - WV_a \qquad (7)$$

is multiplied by $V_a^*$ and averaged to obtain the following relation $$\overline{V_rV_a^*} = \overline{V_mV_a^*} - \overline{WV_aV_a^*} \qquad (8)$$

The objective of the canceller is to establish a weight W which causes a zero correlation to occur between the residual output signal $V_r$ and the auxiliary signal $V_a$. The unnormalized correlation between $V_r$ and $V_a$ is by definition $\overline{V_rV_a^*}$. A zero correlation indicates that the correlated components of $V_m$ and $V_a$ have been cancelled leaving only the desired uncorrelated components as the residual signal $V_r$. If the correlation is set equal to the desired value of zero in eq(8), the equation can be solved for the optimum steady-state value of W as follows:

$$0 = \overline{V_rV_a^*} - \overline{V_mV_a^*} - \overline{W_{opt}V_aV_a^*} \qquad (9)$$

therefore $$W_{opt} = \frac{\overline{V_mV_a^*}}{\overline{V_aV_a^*}} \qquad (10)$$

The weight $W_{opt}$ is substituted into the general equation for canceller loops as follows:

$$V_r = V_m - \left(\frac{\overline{V_mV_a^*}}{\overline{V_aV_a^*}}\right)V_a \qquad (12)$$

Figure 3:
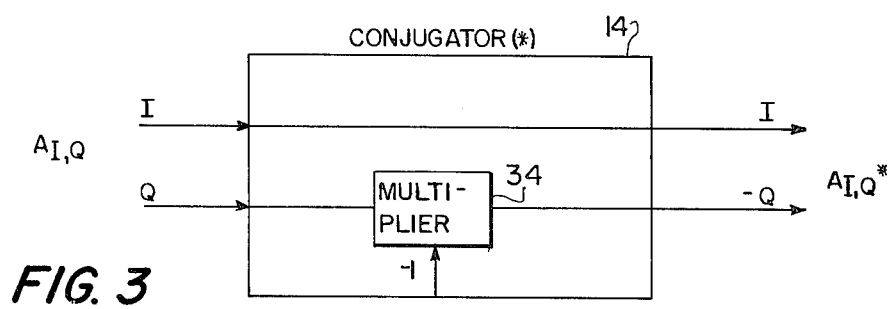
FIG. 3 is a block diagram of a conjugator.

This is the equation which defines the digital open-loop canceller. Note that it is not dependent on gain G or $|V_a|^2$ but is solely dependent on the values of the inputs, $V_a$ and $V_m$, to the canceller. Since the canceller is not a closed loop and is not dependent on gain or power level, it does not have the problems of the adaptive closed loop specified previously. Returning to FIG. 2, the digital I and Q components of $V_m$ are fed to a first multiplier 10 and to a subtractor 12. The digital I and Q components of $V_a$ are fed to a conjugator (*) 14, a second multiplier 16 and to a third multiplier 18. The conjugator receives the I and Q components of $V_a$ and multiplies the imaginary part Q by $-1$ to obtain $V_a^*$. The details of conjugator 14 are shown in FIG. 3, to be described subsequently. The output of conjugator 14 is fed to first multiplier 10 for multiplication with $V_m$ to obtain the product $V_mV_a^*$. The product is applied to first sample summer 20 which will sum N samples from N range cells. An example of a two-sample summer is shown as comprising a one-sample delay 22 and adder 24. The first signal is delayed one sampling period in one sample delay means 22 and then added to a second sample in adder 24. The output of conjugator 14 is also fed to second multiplier 16 for multiplication with $V_a$ to obtain the product $V_aV_a^*$. The product is applied to second sample summer 16 which sums N samples from N range cells. Sample summer 28 may contain for example one-sample delay 28 and adder 30 and is the same as sample summer 20.

The output sums from sample summers 20, 26 are used as part of an averaging process. Normally, to average, the output sums of sample summers 20 and 28 would be divided by the number of the samples summed. However, since the outputs are fed to a divider 32 the sample number which is the same for each sample summer cancels itself out in the division. The output of divider 32 produces the following relation, $$\frac{\overline{V_mV_a^*}}{\overline{V_aV_a^*}}$$

This quantity is the desired value for the weight W.

It can be shown that the quantities of $\overline{V_mV_a^*}$ and $\overline{V_aV_a^*}$ must be averaged (i.e., $\overline{V_mV_a^*}$ and $\overline{V_mV_a^*}$) or all signals out of the canceller are cancelled including the desired components of $V_m$. This can be seen by examining mathmatical correlation functions, for example, those shown in "Reference Data for Radio Engineers", Howard Sams, ITT, 1972, p 39-11. It is further shown by simulation that optimum cancellation occurs when two samples are averaged with the results being slightly different as the number of averaged samples increases. As more pulses are averaged, less of the uncorrelated interference components are cancelled but on the other hand target cancellation decreases by the same amount.

The output of divider 32, weight W, is fed to third multiplier 18, which also receives $V_a$, to obtain the following relation:

$$\left( \frac{\overline{V_m V_a^*}}{\overline{V_a V_a^*}} \right) V_a$$

The output of multiplier 18 is fed to subtracter 12, which also receives $V_m$, to obtain the following relation which is the desired canceller equation.

$$V_r = V_m - \left( \frac{\overline{V_m V_a^*}}{\overline{V_a V_a^*}} \right) V_a$$

The equation is not dependent on gain G or auxiliary power level. The optimum weight W from the input signals is determined in an open-loop manner. The effective gain of the open-loop digital canceller is infinite and stability considerations are completely eliminated. The optimum weighting by the digital open-loop canceller allows cancellation of undesired signals to the thermal noise level.

FIG. 3 shows conjugator 14 of FIG. 2. The I and Q components are fed into the conjugator. The I component passes directly through the conjugator while the Q (i.e., imaginary) component is multiplied by $-1$ in multiplier 34 and fed out as - Q. The output of the conjugator is I, $-$ Q which is the conjugate of I, Q.

Figure 4:
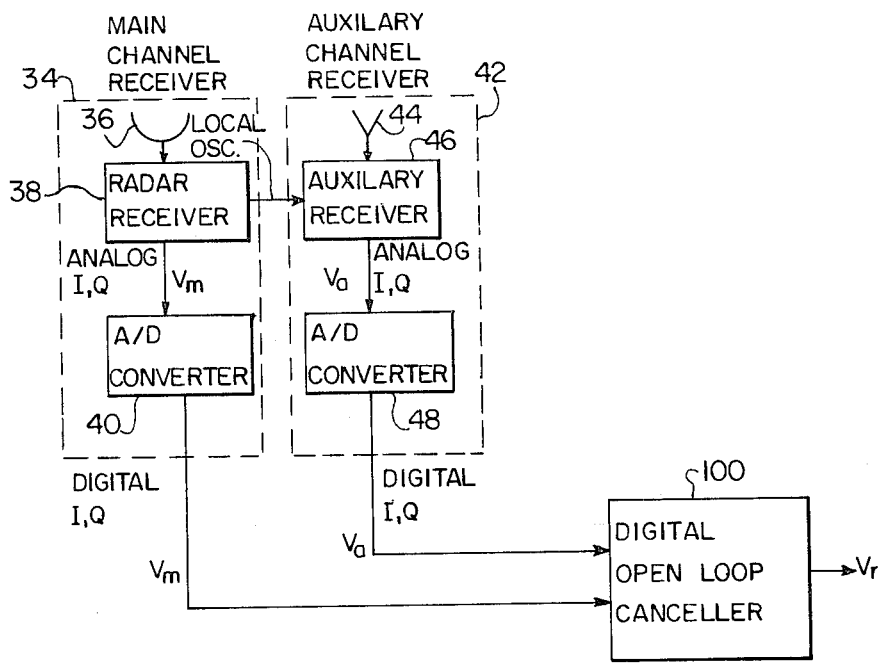
FIG. 4 is a block diagram of a sidelobe canceller using a digital open-loop canceller.

FIG. 4 shows the digital open-loop canceller of FIG. 2 used in a sidelobe canceller system. A main channel receiver 34, including main radar antenna 36, radar receiver 38, and A/D converter 40, is used to receive radar echo signals from a target and any interference or jamming that may be present. An output signal $V_m$ having digital I and Q components is produced. Main radar antenna 36 is directional and receives a complex signal having a radar component and an interference component. An output is provided to radar receiver 38 which produces a video output signal separated into analog I and Q components. This signal is fed to A/D converter 40 for conversion to digital I and Q components which comprise signal $V_m$.

Auxiliary channel receiver 42, including auxiliary antenna 44, auxiliary receiver 46, and A/D converter 48, receives interference or jamming signals and produces an output $V_a$ having digital I and Q components. Auxiliary antenna 44 is an omnidirectional antenna having a gain greater than the largest sidelobe of main radar antenna 36. Auxiliary receiver 46 and A/D converter 48 operates to produce the signal $V_a$ which has digital I and Q components.

The digital complex signals $V_m$ and $V_a$ are inputs to the digital open-loop canceller 100 which was described previously in FIG. 2. It is appropriate to describe how the digital open-loop canceller operates specifically in a sidelobe canceller. As previously stated, $V_m$ is a complex signal having a component which is a target echo and a component which is from a jammer. $V_a$ is primarily a jamming signal correlated to the jamming component of $V_m$. The digital open-loop canceller decorrelates the signal $V_a$ from the output signal $V_r$ meaning that the canceller loop causes the correlated components of $V_m$ and $V_a$ to cancel and allows the decorrelated components to remains as $V_r$. This means the jamming signals, which were correlated, cancel while target signals, which were uncorrelated, remain.

FIG. 4 is a sidelobe canceller system utilizing only one auxiliary antenna and one digital open-loop canceller. Such a system will cancel jamming from only one jamming source. All sidelobe canceller systems require N auxiliary antennas and N or more digital open-loop cancellers to cancel jamming from N jammers. An example of such a system for cancelling N auxiliary signals is disclosed in U.S. Pat. No. 3,938,153 hereby incorporated by reference. The digital open-loop cancellers would be used in place of the adaptive canceller loops described in the patent. One restriction on the use of the digital open-loop canceller is that, since it is an open loop, it cannot be used in parallel configurations as adaptive closed-loop cancellers may. Such parallel configurations are common in the art and described in U.S. Pat. No. 3,202,990. However, it should be noted that the digital open-loop, as it would be used in U.S. Pat. No. 3,938,153, eliminates the need for parallel configurations of adaptive closed loop cancellers and has significant advantages as cited in the referenced patent and herein.

Figure 5:
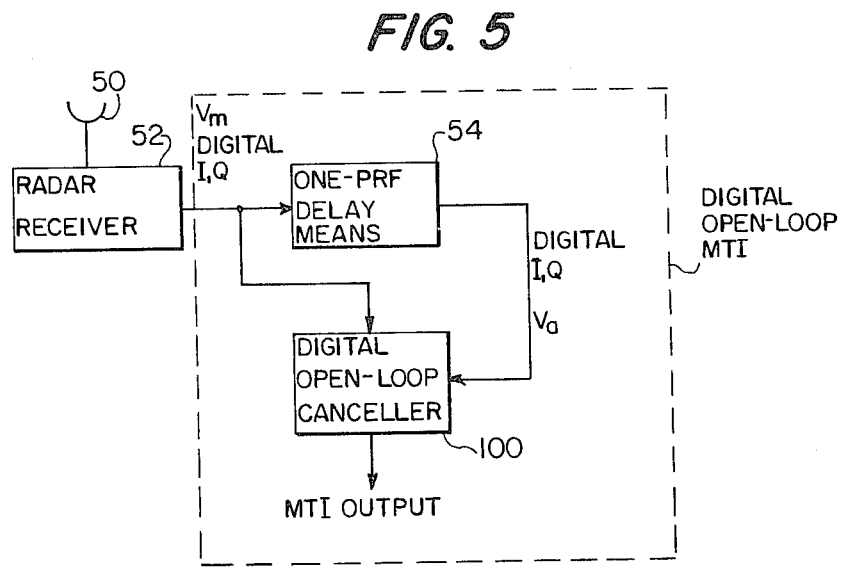
FIG. 5 is a block diagram of an MTI system using a digital open loop canceller as an MTI filter.

FIG. 5 shows the digital open-loop canceller of FIG. 2 used in a two-pulse MTI system. An antenna 50 receives target return pulses which are complex signals. If the target is moving, successive pulses will have a phase change between them. The pulses are fed to receiver 52 which processes the pulses and produces video pulses $V_m$ having digital I and Q components. The signal $V_m$ is fed to a one-prf delay means 54 in the customary manner for an MTI. The output of one-prf delay means 54 will be the signal $V_a$ having digital I, Q components. The signals $V_m$ and $V_a$ are fed respectively to the $V_m$ and $V_a$ inputs for the digital open-loop canceller described in FIG. 2. By definition, an MTI system removes signals that are correlated on a pulse-to-pulse basis (i.e., from a stationary target) and only passes signals that are uncorrelated (i.e., vary in phase from puolse-to-pulse). The digital open-loop canceller performs this function of passing only uncorrelated moving-target signals.

In operation, the digital open-loop canceller described in FIG. 2 may be substituted for a closed-loop adaptive canceller in most applications. Mathmatically, the two circuits solve the same general equation for a canceller loop as described previously.

The advantage of using the digital open-loop canceller in a sidelobe canceller or MTI is that optimum cancellation of unwanted signals results with complete freedom from instability.

Obviously many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. A digital open-loop canceller receiving a digital complex main input and a digital complex auxiliary input which may have correlated signal components comprising:
   conjugator means for receiving and conjugating a said digital complex auxiliary signal;

first multiplier means for receiving and multiplying said digital complex main input and the output of said conjugator;

second multiplier means for receiving and multiplying said digital complex auxiliary input and the output of said conjugator;

first sample summer means for receiving and summing N sample outputs of said first multiplier means, where N is an integer greater than one;

second sample summer means for receiving and summing N sample outputs of said second multiplier means where N is an integer greater than one;

divider means for receiving and dividing the outputs of said first and second sample summer means to produce an output which is a weight;

third multiplier means for receiving and multiplying said digital auxiliary signal and the output of said divider means; and subtracter means for receiving and subtracting said digital complex main signal and said third multiplier output to produce an output signal in which said correlated signal components have been cancelled.

2. The digital open-loop canceller of claim 1 in which said first and second sample summers each comprise a one-sample delay means and an adder to sum two sample outputs from said first and second multipliers, respectively.

3. A sidelobe canceller system including a digital open-loop canceller for cancelling interference signals from a radar echo received from a target comprising:

main channel receiver means for receiving and digitizing a main channel radar signal from a main radar antenna, said main channel radar signal having a target echo component and possible interference components;

auxiliary channel receiver means for receiving and digitizing an auxiliary channel signal from an auxiliary antenna, said auxiliary channel signal being primarily comprised of interference components, which are correlated with the interference components of the main channel radar signal;

conjugator means for receiving and conjugating said digital complex auxiliary channel signal from said auxiliary channel receiver means;

first multiplier means for receiving and multiplying the output of said conjugator and said digital main channel radar signal;

second multiplier means for receiving and multiplying the output of said conjugator and said digital auxiliary channel signal;

first sample summer means for receiving and summing N sample outputs of said first multiplier means, where N is an integer greater than one;

second sample summer means for receiving and summing N sample outputs of said second multiplier means, where N is an integer greater than one;

divider means for receiving and dividing the outputs of said first and second sample summer means to produce an output which is a weight;

a third multiplier means for receiving and multiplying said digital auxiliary channel signal and the output of said divider means to produce an output which is a weighted digital auxiliary channel signal; and subtractor means for receiving and subtracting said digital complex main channel radar signal and said third multiplier output to produce an output signal in which the correlated interference components of said main channel radar signal are cancelled.

4. The sidelobe canceller system of claim 3 in which said first and second sample summer each comprise one-sample delay means and an adder to sum two sample outputs of said first and second multipliers.

5. The sidelobe canceller system of claim 4 in which:

said main channel receiver means include a directional main radar antenna, a radar receiver which receives the main radar antenna signal and an analog-to-digital converter receiving the output of the radar receiver, and said auxiliary channel receiver means includes an omnidirectional auxiliary antenna with a gain greater than the largest sidelobe of a main radar antenna, an auxiliary receiver which receives the auxiliary antenna signal and an analog-to-digital converter which receives an auxiliary receiver signal.

6. A moving-target-indicator system including a digital open-loop canceller for cancelling stationary clutter and indicating moving targets comprising:

radar receiver means for receiving and digitizing target return pulses;

one-prf delay means for receiving and delaying target return pulses by one prf period;

conjugator means for receiving and conjugating the output of said one-prf delay means;

first multiplier means for receiving and multiplying the output of said conjugator means and said digitized target return pulses;

second multiplier means for receiving and multiplying the outputs said conjugator means and said one prf delay means;

first sample summer means for receiving and summing two successive sample outputs of said first multiplier means;

second sample summer means for receiving and summing two successive sample outputs of said second multiplier means;

divider means for receiving and dividing the outputs of said first and second sample summer means to produce an output which is a weight;

third multiplier means for receiving and multiplying said digital target return pulses and the output of said divider means;

subtractor means for receiving and subtracting said target return pulse and said third multiplier output to produce an output signal in which correlated clutter signals are cancelled.

* * * * *